United States Patent [19]
Massie

[11] Patent Number: 5,889,387
[45] Date of Patent: Mar. 30, 1999

[54] BATTERY CHARGING UNIT

[75] Inventor: Harold L. Massie, West Linn, Oreg.

[73] Assignee: Intel Corporation, Santa Clara, Calif.

[21] Appl. No.: 764,930

[22] Filed: Dec. 13, 1996

[51] Int. Cl.$^6$ ....................................................... H02J 7/00
[52] U.S. Cl. ............................ 320/145; 320/146; 320/163
[58] Field of Search .................................... 320/162, 163, 320/141, 145, 146

[56]  References Cited

U.S. PATENT DOCUMENTS

| | | | |
|---|---|---|---|
| 4,039,920 | 8/1977 | Popp | 320/146 |
| 4,472,672 | 9/1984 | Pacholok | 320/145 |
| 4,607,208 | 8/1986 | Vreeland | 320/145 |
| 5,198,743 | 3/1993 | McClure et al. | 320/145 |
| 5,698,963 | 12/1997 | Seong et al. | 320/145 |
| 5,739,667 | 4/1998 | Matsuda et al. | 320/162 |

Primary Examiner—Peter S. Wong
Assistant Examiner—K. Shin
Attorney, Agent, or Firm—Kenyon & Kenyon

[57]  ABSTRACT

A battery charging circuit, particularly useful in a laptop computer system, includes a voltage input terminal coupled to a dc voltage. A first switch couples the voltage input terminal to an output coupled to the battery through a current sense resistor. A first current sink which is on when the charger circuit is on draws current from the input side of the current sense resistor through a first resistor to develop a first voltage. This voltage and a voltage coupled through a second resistor from the battery side of the sense resistor are inputs to a comparator, the output of which controls the first switch. A second current sink, when on, draws current through the second resistor causing the first switch to be held off, turning the charging circuit off. An ON/OFF terminal, to which a variable duty cycle square wave is supplied, controls the turning on and off of the first and second current sinks, with the length of the duty cycle controlling the average current supplied to the battery.

31 Claims, 6 Drawing Sheets

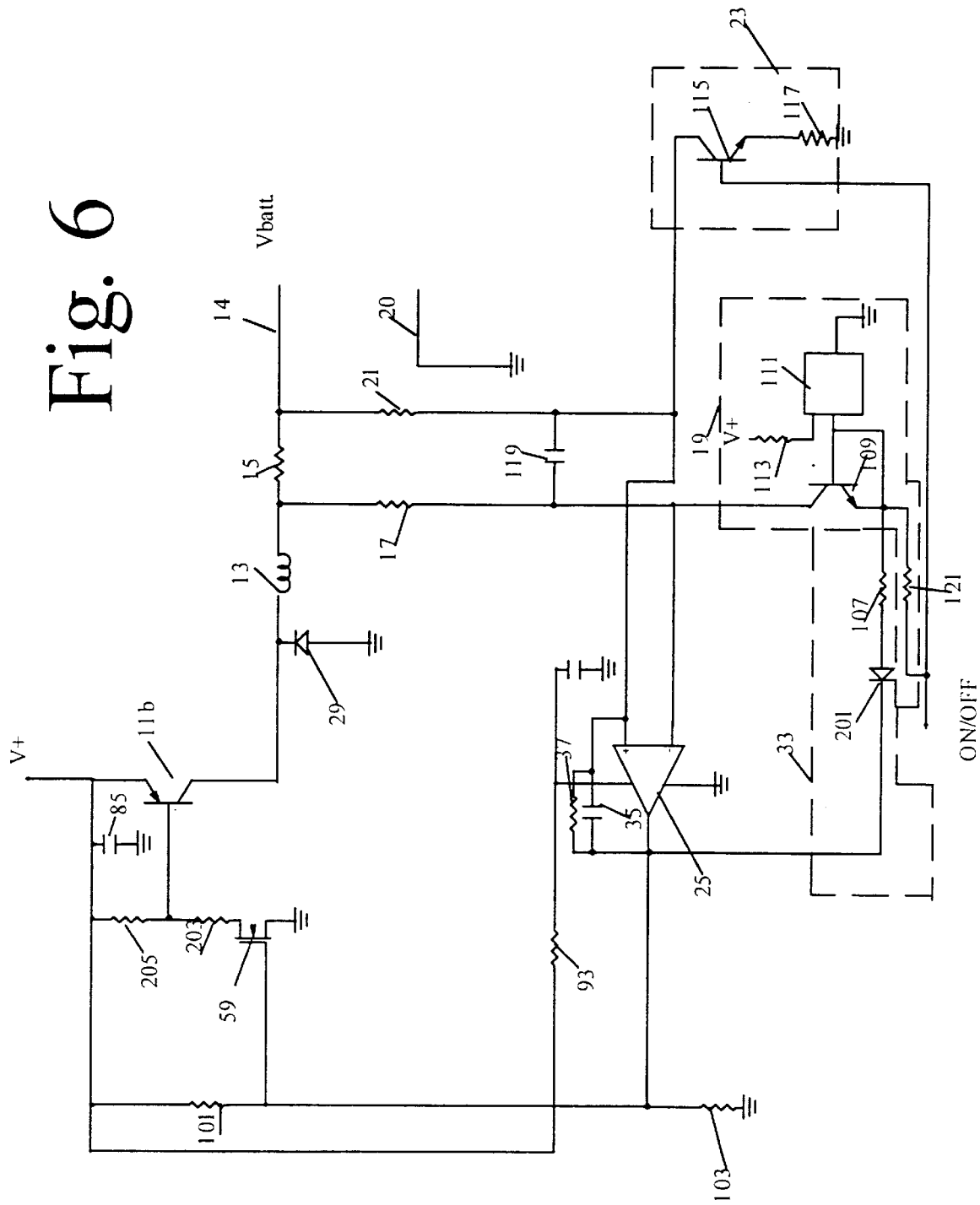

5,889,387

BATTERY CHARGING UNIT

BACKGROUND OF THE INVENTION

The present invention relates to battery charging in general and more particularly to a low cost highly efficient battery charging circuit particularly useful for mobile computers.

Mobile computers, for example, portable and lap top computers have the capability of operating from a rechargeable battery. This requires that the battery be periodically recharged. Such computers typically have built into them a battery charging circuit for this purpose. Either externally or internally to the computer box, line current is converted to a direct current of the desired value and reduced in voltage. Alternatively voltage from a dc source such a car battery is converted to an appropriate voltage. This voltage is then used through the battery charging circuit to recharge the battery. Typical circuits presently in use are linear circuits which have a relatively low efficiency. Furthermore, these prior art battery charging circuits are relatively costly and have a charging current which is a function of voltage. Thus, there is a need for a low cost, highly efficient battery charging unit.

SUMMARY OF THE INVENTION

An embodiment of the present invention is directed to a method of charging a battery in a computer accomplished by switching a supply voltage to the battery on and off at a first predetermined frequency and controlling the average current supplied to said battery by controlling a duty cycle of said switching.

One embodiment of battery charger circuit includes a voltage input terminal and a voltage output terminal. A first switch has an input coupled to the voltage input terminal, an output and a switch control input. The switch output is coupled to the voltage output terminal through a current sense resistor. A first current sink has a first current input coupled through a first resistor to the side of the current sense resistor coupled to the switch output and has a first control input. A second current sink has a second current input coupled through a second resistor to the voltage output terminal, and has a second control input. A comparator has a first input coupled to the first current input and a second input coupled to the second current input and an output coupled to the switch control input. A battery charger ON/OFF input terminal is coupled to the control inputs of the first and second current sinks.

BRIEF DESCRIPTION OF THE DRAWINGS

FIG. 6 is a circuit diagram showing a third implementation of the embodiment of FIG. 2.

DETAILED DESCRIPTION

Figure 1:
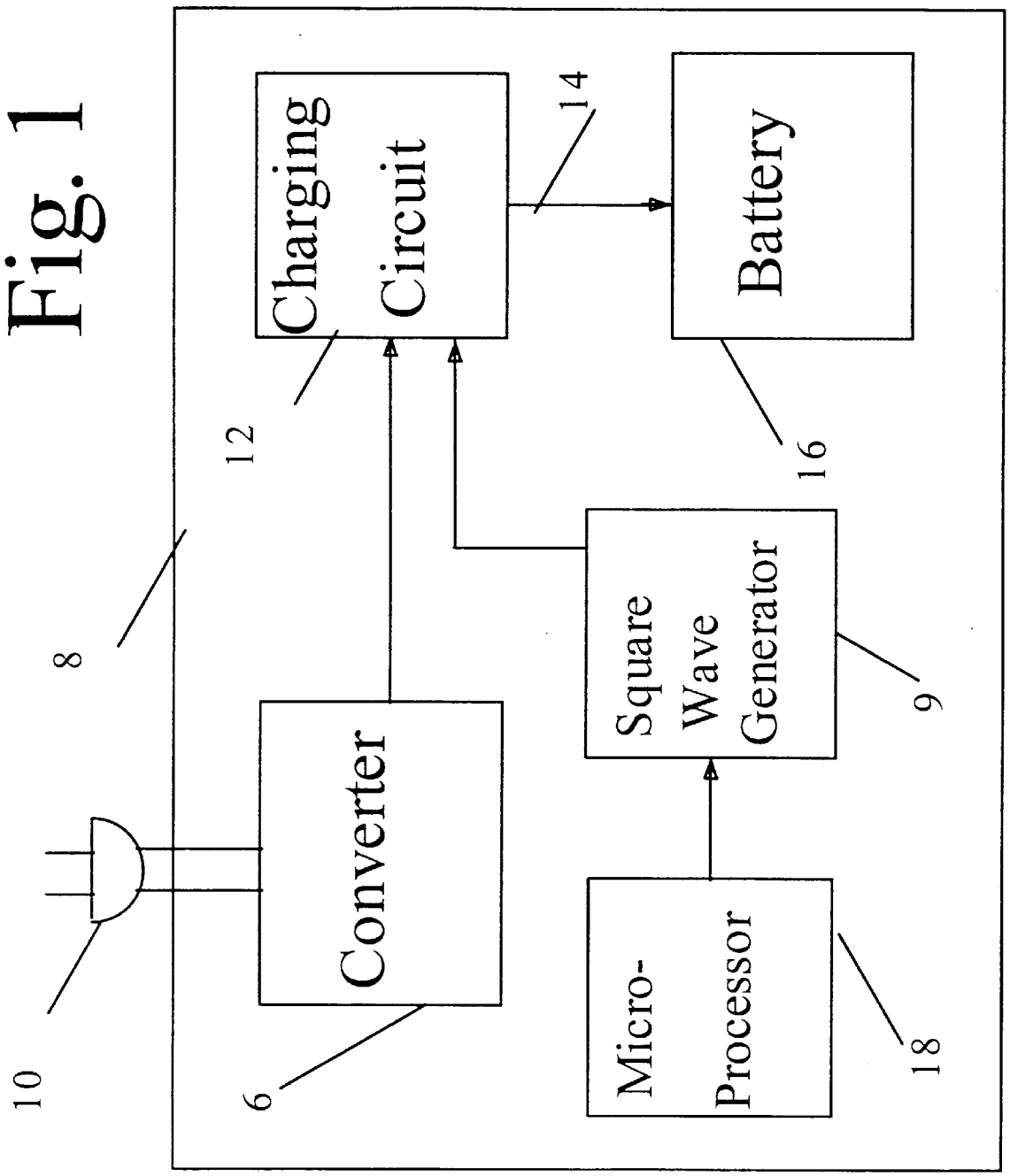
FIG. 1 is a block diagram of a computer system which includes an embodiment of a battery charging circuit according to the present invention.

FIG. 1 is a block diagram of a computer system which includes an embodiment of a battery charging circuit according to the present invention. For example, the computer system may be a portable or laptop computer contained in a computer box 8. As illustrated, within the computer box 8 is a converter circuit 6, e.g., an ac to dc converter receiving line current through a plug 10 which will be plugged into an outlet in conventional fashion. Alternatively, the converter may convert a dc source such as a car battery to the dc voltage required by the computer system. The output of the converter 6 is a dc voltage of 24 volts, for example. This voltage is an input to a charging circuit 12 which is one of the embodiments of the charging circuit of the present invention described below. The charging circuit 12 provides an output on line 14 to a battery 16. The computer system 8 includes the conventional elements found in a computer such as a laptop or portable computer including a microprocessor 18 which provides control inputs, i.e., inputs which control the turning on and off of the battery charger and the amount of current it supplies to the charging circuit 12, either directly or through appropriate peripheral circuits. In the illustrated embodiment, microprocessor 18 controls the duty cycle of a wave generator 9 which provides an input to the charging circuit. The nature of the signal output by wave generator 9 will be described in more detail below.

Figure 2:
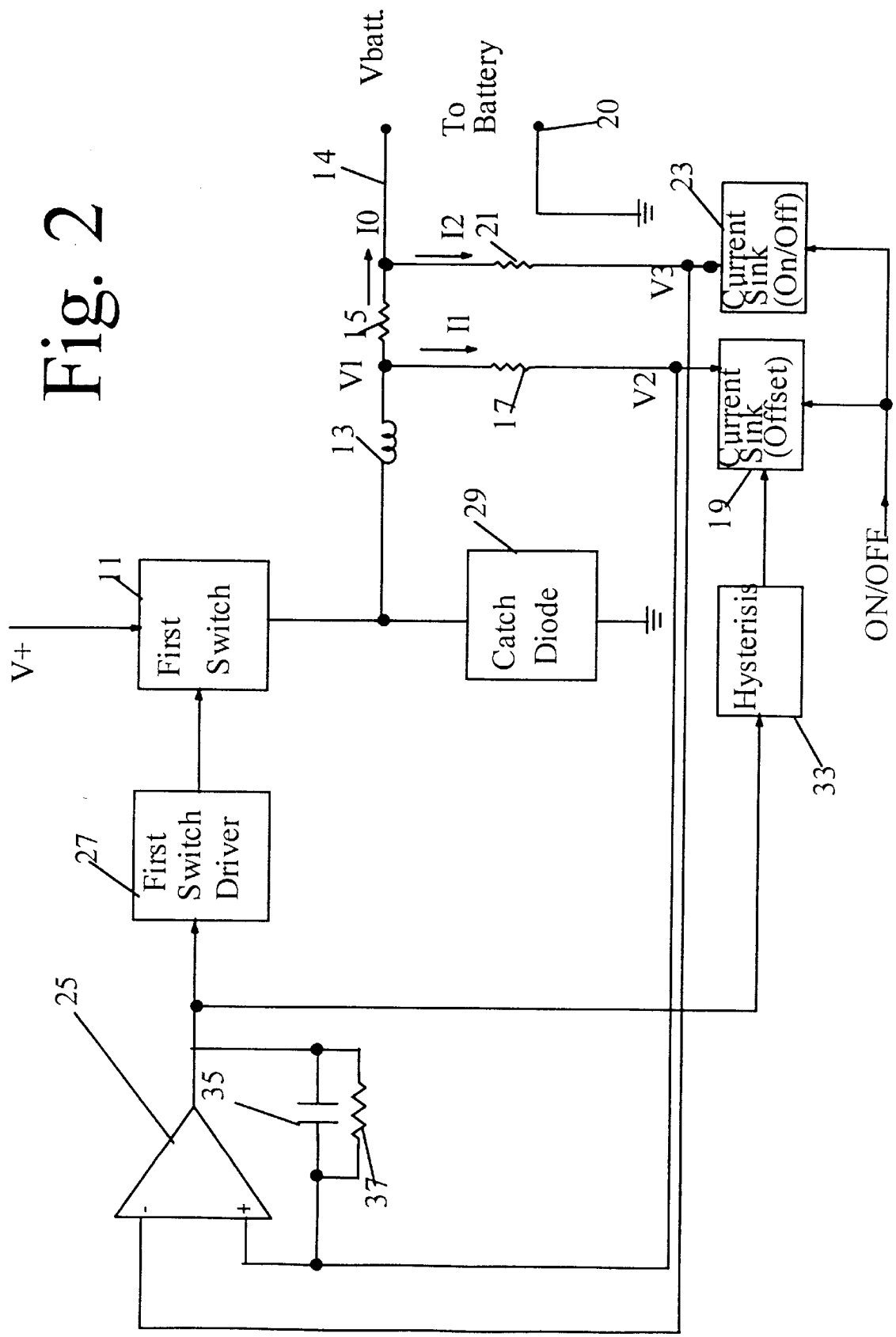
FIG. 2 is a block diagram of a first embodiment of a battery charging circuit according to the present invention.

FIG. 2 illustrates a block diagram of a first embodiment of a charging circuit according to the present invention. The illustrated embodiment of the battery charging circuit shown in FIG. 2 is a switching circuit in which the average charging current is programmable by controlling the duty cycle of an ON/OFF signal. The ON/OFF signal is a variable duty square wave signal which is supplied by the variable wave generator of FIG. 1. This is, when it is desired to charge, a square wave which alternates between on and off is supplied. If the charge is off completely, a level keeping the charger off is supplied. As shown a first switch 11 of FIG. 1 for example, a semiconductor switch is utilized to couple the voltage V+ at the voltage input terminal which has been obtained from the converter 9 of FIG. 1 to one end of an output inductor 13. Output inductor 13 is in series with a current sense resistor 15, with the current sense resistor providing, at its output, the voltage $V_{batt}$ which may be supplied to the battery over line 14. Also shown is the ground connector 20 for the battery. The input side of the resistor 15 is coupled through a resistor 17 to a first current input of a first current sink designated as an offset current sink 19. The output side of resistor 15, i.e., the output terminal on line 14, is coupled through a resistor 21 to the second current input of a second a current sink 21 designated as an ON/OFF current sink. The first current input to current sink 19 is coupled as the non-inverting input to a comparator 25. The inverting input of comparator 25 is coupled the second current input of second current sink 21. Coupled across the non-inverting input and output of comparator 25 is a parallel circuit including a capacitor 35 and resistors 37. The output of comparator 25 is the input to a switch driver 27, the output of which drives the first switch 11. A circuit 29 comprising, in this embodiment, a catch diode 29 couples the input side of the inductor 13 to ground. Also shown is an optional hystersis circuit 33 coupled between the output of comparator 25 and a control input of first current sink 19. Other arrangements of hystersis circuits may be used as will be described below.

In operation, consider the first switch 11 being turned on connecting the input voltage V+ to the input of inductor 13. The current will flow through the inductor 13 and resistor 15 to the battery over line 14. The current I0 flowing to the battery will be at the minimum of the ripple current. The ON/OFF signal is in an ON state and current sink 19 is turned on so that a current I1 is flowing through resistor 17. The voltage at resistor 15 where it is connected to the input of resistor 17 is designated V1. The voltage at the input to current sink 19 where it is connected to resistor 17 is V2. This voltage is provided to the non-inverting input of comparator 25. The value of the resistor 17 may be selected such as to result in a 100 millivolt drop for a current I1. Current sink 23 is turned OFF and thus the voltage V3 at the output of resistor 21 which is coupled to the negative input of comparator 25 will be equal to the $V_{batt}$ since I2, the current flowing through resistor 21 is zero. As a result, V2 is, for example, 100 millivolts more negative then V3. A current sink is used to make the negative offset voltage on V2 independent of the voltage.

Because V2 is less than V3, the output of comparator 25 is low. This low output is inverted in switch driver 27 which produces a high input at the control input of first switch 11 to keep it on. As will be seen below, in some embodiments, this polarity will be reversed depending on the type of switch used. As I0 increases, the voltage drop due to I0 across the current sense resistor 15 increases until V2 just exceeds V3. At this point, the comparator will change state shutting off first switch 11. The output I0 will then begin to flow through the catch diode 29 and decrease to a value as determined by the hystersis from resistor 37 and capacitor 35. The peak-to-peak ripple current may be 0.2 to 0.6 A peak-to-peak. The comparator output will again go low and the cycle will repeat itself continuously at, for example, a 100 Khz rate.

The ON/OFF signal is applied to the first control input of first current sink 19 and the second control input of second current sink 23. In the embodiment illustrated, when the ON/OFF signal is high, the charger is off and, when it is low, the charger is on. A low signal turns on the current sink 19. A high voltage turns the current sink 23 on. With the current sink 23 on, the voltage V3 will be less than the voltage V2 resulting in the first switch 11 and thus the battery charger, being turned off.

In a typical application to a mobile computer, the peak output current I0 maybe set to about 1.6 amperes to give an average current of about 1.3 A at 100 Khz. The ON/OFF signal can be controlled by the microprocessor to be a square wave oscillation waveform of about 10 Khz with a variable duty cycle. This variable duty cycle permits adjusting the average output current over a wide range from a few milliamps to the full average output of about 1.3 A. As shown, hystersis may be applied through the circuit 33 to the current sink 19 to delay turning off current sink 19 when the ON/OFF signal goes off. With this arrangement, the average charging current is set by switching the charger on and off. Because the circuit is a switching regulator circuit it is very efficient. Furthermore, the charging current is independent of battery voltage, with the embodiment of the present invention illustrated.

Thus, in the method of charging a battery illustrated by the embodiment of FIG. 2, a voltage is switched on to cause a current to flow to the battery. The current flowing to the battery is sensed and the voltage switched off when a first predetermined value of current is sensed. The voltage is switched on again when the current drops below a second predetermined value. This turning on and off is repeated and results in switching on and off at a first predetermined frequency, for example, 100 KHZ. Superimposed on this switching is a switching on and off of the battery charger, i.e, alternately disabling and enabling the switching of voltage on and off at the first predetermined frequency, at a second predetermined frequency, e.g., 10 KHZ. The average current supplied to the battery is controlled by controlling the duty cycle of the second predetermined frequency.

Furthermore, in the illustrated embodiment, the sensing of current flow is accomplished by sensing the voltage drop across current sense resistor 15. This is done by sinking current through a first resistor 17 coupled to the input side of resistor 15 to establish an offset voltage V2 having said first predetermined value. This value is compared to the voltage V3 at the other side of resistor 15. The supply voltage is switched off when the voltage V3 at the other side of current sense resistor 15 drops below the offset voltage V2. A hystersis is established in the switching circuit which delays switching back on and establishes the first predetermined frequency.

The turning off of the battery charger, i.e., disabling, is accomplished in the illustrated embodiment by sinking current from the other side of current sense resistor 15 through a second resistor 21 and stopping sinking of current through first resistor 17 to disable said switching on and off at the first predetermined frequency. When the battery charger is operating, turning on and off of the charger by turning the current sinks 19 and 23 on and off, as described, is accomplished with a square wave having the second predetermined frequency.

Also in the illustrated embodiment, the comparing is done by comparing the voltage V2 developed across first resistor 17 with the voltage V3 developed across second resistor 21.

Figure 3:
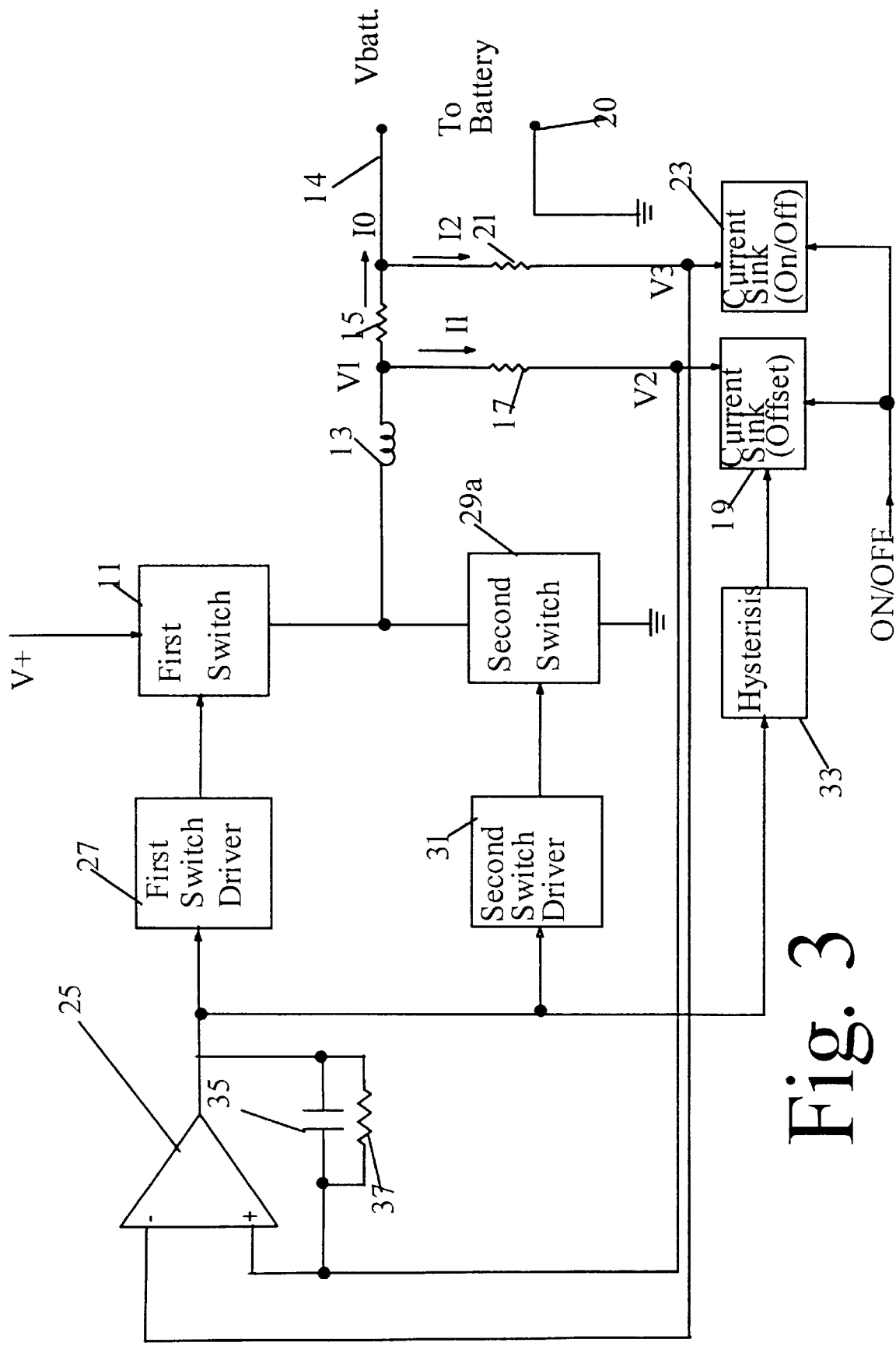
FIG. 3 is a block diagram of a second embodiment of a battery charging circuit according to the present invention.

FIG. 3 is a block diagram identical to the block diagram of FIG. 2 except that in place of the catch diode there is a second switch 29a. Again, this may be a semiconductor switch. Second switch 29a is driven by a switch driver 31 which is coupled to the output of comparator 25. Second switch 29a turns on synchronously with the turning off of first switch 11 to conduct I0 to ground as explained above.

Figure 4:
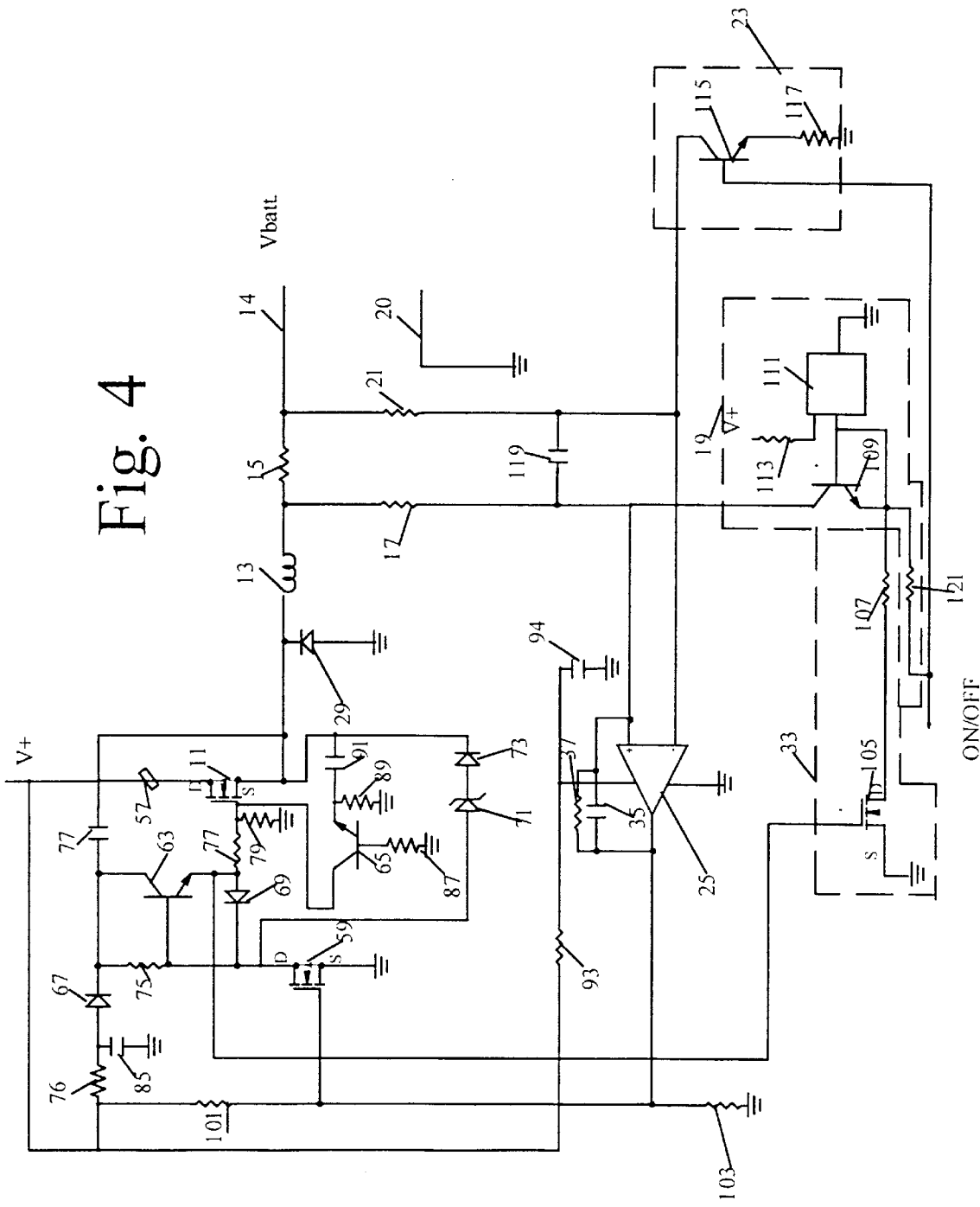
FIG. 4 is a circuit diagram of a first implementation of the embodiment of FIG. 2.

FIG. 4 is a circuit diagram of a first implementation of the embodiment of FIG. 2. In the circuit of FIG. 4, the inductor 13, resistor 15, resistors 17 and 21 are exactly as shown in FIG. 1. The first switch 11 is an N-channel MOSFET, the source of which is coupled to the input of inductor 13. The drain of FET 11 is coupled to the voltage V+ which may be 24 volts, for example. The line extending between the drain of FET 11 and the voltage source V+ has a ferrite bead 57 in it to prevent high frequency ringing. The switch driver for FET 11 includes an FET 59, the gate of which is coupled to the output of comparator 25 and a transistor 63 having its base coupled to the drain of FET 59. Also included in the FET driver circuit is a transistor 65 and diodes 67, 69, and 73 and zener diode 71.

The source of FET 59 is coupled to ground and its drain coupled through a resistor 75 to the cathode of diode 67. The Junction between the drain of FET 59 and resistor 75 is also coupled to the collector of transistor 63. The anode of diode 67 is coupled through a resistor 76 to the voltage V+. A capacitor 77 is coupled across the collector of transistor 63 and the source of FET 11. The emitter of transistor 63 is coupled to the anode of diode 69, the cathode of which is coupled to the drain of transistor 59. Also coupled to the emitter terminal of transistor 63 are two resistors 77 and 79 in series to ground. The junction point of these two resistors is coupled to the gate of FET 11. The junction between resistor 75 and the anode of diode 67 is coupled through a capacitor 85 to ground. Transistor 65 has its base coupled to ground through a resistor 87. The emitter of transistor 65 is coupled through a resistor 89 to ground and to a capacitor 91 having its other terminal coupled to the source of FET 1. The V+ voltage is provided through a resistor 93 to the $V_{cc}$ input of comparator 25 to provide its operating voltage. This terminal is also coupled to ground through a capacitor 94. A capacitor 119 extends between the two lines coupled to the inputs of comparator 25. A resistor divider made up of resistors 101 and 103 extends between V+ and ground. The output of the comparator 25 is coupled to the junction of these two resistors which junction is also coupled to the gate 61 of FET 59.

In operation, transistor 63 is used to drive the gate of FET 11 high. Diode 67 and capacitor 77 provide a bootstrap circuit to drive the gate of FET 11 above its source to turn it on. FET 59 and diode 69 are used to drive gate 83 low. In other words, with a low output from comparator 25, FET 59 is turned off and the voltage on the base of transistor 63 turns it on to provide a high voltage on the gate 83 to turn on the FET 11. When the comparator 25 goes high, the FET 59 is turned on, turning off transistor 63 and at the same time coupling the gate 83 of FET 11 to ground through resistor 77, diode 69 and transistor 59. The purpose of the transistor 65 is to increase the efficiency by driving the gate of the high side FET 11 below ground at the turn off of the high side FET 11. The diodes 71 and 73 protect the FET 11 by clamping the gate to source voltage.

The emitter of transistor 63 is coupled back to hystersis circuit 33. Circuit 33 includes, a FET 105 having its gate coupled to the emitter of transistor 63, its source coupled to ground and its drain coupled to one side of a resistor 107. Resistor 107 has its other side coupled to the emitter of a transistor 109 in the first current sink 19. Transistor 109 has its collector coupled to the resistor 17 and its base coupled to a voltage reference 111 which receives an input from V+ through a resistor 113. The reference input of the voltage reference is also coupled to the emitter of transistor 109. The voltage reference provides in the illustrated embodiment +2.5 V to the base of transistor 109.

The second current sink 23 includes a transistor 115 having its collector coupled to resistor 21 and having its emitter coupled through a resistor 117 to ground. The base of transistor 115 is coupled to the ON/OFF signal input. Thus, when this signal is high it turns transistor 115 on to turn the battery charger off as explained above. The ON/OFF input is also coupled through a resistor 121 to the emitter of transistor 109. A high voltage on the ON/OFF input results in transistor 109 being turned off, and a low voltage on the input causes it to be turned on.

Hystersis circuit 33 provides some hystersis by increasing the current in transistor 109 a small amount since its emitter is also coupled to ground through resistor 107 and FET 105.

Figure 5:
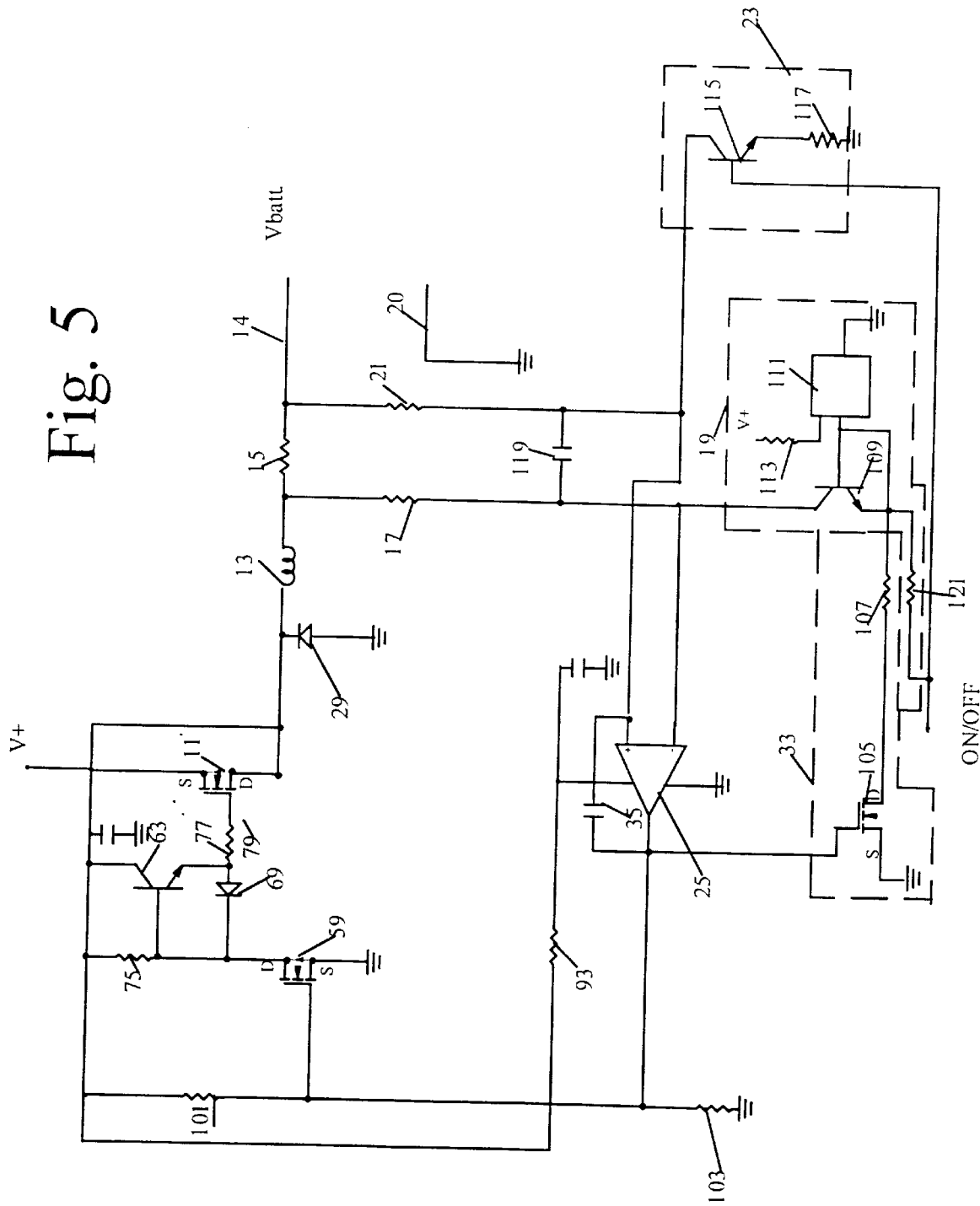
FIG. 5 is a circuit diagram showing a second implementation of the embodiment of FIG. 2.

FIG. 5 is a circuit diagram showing an implementation of the embodiment of FIG. 2 utilizing a P-channel MOSFET. The portions of this circuit including the first current sink 23, second current sink 19 and hystersis circuit 33 along with the inductor 13, current sense resistor 15 and resistors 17 and 21 are exactly as in the implementation of FIG. 4. However, a P-channel MOSFET 11a is used as the first switch. Because a P-channel MOSFET is used, the polarities at the comparator 25 are reversed. Also, in this case, only a capacitor 35 rather than a capacitor and resistor in series is coupled from the non-inverting input of the comparator 25 to its output to provide hystersis. In addition, again because of the inversion, the input to the gate of FET 105 in the hystersis circuit 33 is coupled directly to the output of the comparator 25. Operation of the circuit of FIG. 5 is similar to the operation of the circuit of FIG. 4 except for the reversal of polarities.

The embodiment of FIG. 6 utilizes a PNP transistor 11b as the first switch to switch the voltage V+ to the inductor 13. The sensing portion of the circuit of FIG. 6 is essentially the same as that of FIGS. 4 and 5. Thus, the inductor 13, resistor 15, resistor 17, resistor 21, capacitor 119 and the first and second current sinks 19 and 23 are as described above. The hystersis circuit 33 is different. In this case a diode 201 has its cathode coupled to the output of the comparator 25 and its anode coupled to the resistor 107. As with the implementation of FIG. 5, the inputs to the comparator 25 are reversed as compared to those of FIG. 4. The output of the comparator drives a FET 59 having in its drain path two resistors 203 and 205 in series. The junction of the two resistors is coupled to the base of the transistor 11b. With the FET 59 turned off, the voltage V+ will appear at the base of transistor 11b and it will be turned off. When the FET 59 is turned on, the resistor divider will be coupled between ground and V+ establishing a bias voltage on the base of transistor 11b which will be less than the voltage V+ on its emitter causing the transistor to turn on and supply the voltage V+ to the inductor 13. Turning the transistor on and off takes place in response to the changing output of the comparator 25 in the same manner as described above. The embodiments of FIGS. 5 and 6 used fewer parts than the embodiment of FIG. 4.

Although specific embodiments have been illustrated and described, it will be recognized that various additional modifications can be made without departing from the spirit of the invention which is intended to be limited solely by the appended claims.

What is claimed is:

1. A battery charger circuit comprising:
   a. a voltage input terminal;
   b. a voltage output terminal;
   c. a first switch having an input, coupled to said voltage input terminal, an output, and a first switch control input;
   d. a current sense resistor having one end coupled to said first switch output and another end coupled to said voltage output terminal;
   e. a first current sink having a first current input and a first control input;
   f. a second current sink having a second current input and a second control input;
   g. a first resistor coupling said one end of said current sense resistor junction to said first current input;
   h. a second resistor coupling said other end of said current sense resistor to said second current input;
   i. a comparator having a first input coupled to said first current input and a second input coupled to said second current input and an output coupled to said first switch control input; and
   j. an ON/OFF input terminal coupled to said first and second current sink first and second control inputs.

2. A battery charger circuit according to claim 1 and further including an inductor having one end coupled to said switch output and another end coupled to said one end of said current sense resistor.

3. A battery charger according to claim 2 and further including a first switch driver coupling said comparator output to said first switch control input.

4. A battery charger according to claim 3 and further including a circuit coupling said one end of said inductor to ground.

5. A battery charger according to claim 4 wherein said circuit coupling said one end of said inductor to ground comprises a catch diode.

6. A battery charger according to claim 4 wherein said circuit coupling said one end of said inductor to ground comprises a second switch having an input coupled to said inductor, an output coupled to ground and a second switch control input coupled to said comparator output.

7. A battery charger according to claim 6 and further including a second switch driver circuit coupled between said comparator output and said second switch control input.

8. A battery charger according to claim 7 wherein said first and second switches comprise FET switches.

9. A battery charger according to claim 3 wherein said first switch comprises a first FET.

10. A battery charger according to claim 9 wherein said first FET comprises a P-channel FET.

11. A battery charger according to claim 9 wherein said first FET comprises an N-channel FET.

12. A battery charger according to claim 3 wherein said first switch comprises a bipolar transistor.

13. A battery charger according to claim 3 and further including a first hystersis circuit coupled between said output of said comparator and one of its first and second inputs.

14. A battery charger according to claim 8 wherein said first hystersis circuit comprises a resistor and capacitor in parallel.

15. A battery charger according to claim 3 and further including a second hystersis circuit coupled between the output of said comparator and said first current sink first control input.

16. A battery charger according to claim 15 wherein said second hystersis circuit comprises a FET having a source, drain and gate, the gate of said FET coupled to said comparator output and one of its source and drain coupled to ground, the other of the source and drain coupled to said output terminal of said transistor switch in said first current sink.

17. A battery charger according to claim 1 wherein said first current sink comprises a first semiconductor switch having and an input terminal and an output terminal and a control input, and a voltage reference circuit having an output coupled to said semiconductor switch control input, the input of said switch forming said first control input and coupled to said first resistor and the output of said switch coupled to said ON/OFF terminal.

18. A battery charger according to claim 17 wherein said second current sink comprises a second semiconductor switch having an input coupled to said second current input, an output coupled to ground and a control input forming said second control input and coupled to said ON/OFF terminal.

19. A laptop computer system comprising:
   a. a square wave generator circuit having a battery charger ON/OFF signal as an output;
   b. a microprocessor coupled to control said circuit
   c. a battery;
   d. a battery charging circuit comprising:
      i. a voltage input terminal;
      ii. a voltage output terminal;
      iii. a first switch having in input, coupled to said voltage input terminal, an output, and a switch control input;
      iv. a current sense resistor having one end coupled to said switch output and another end coupled to said voltage output terminal;
      v. a first current sink having a first current input and a first control input;
      vi. a second current sink having a second current input and a second control input;
      vii. a first resistor coupling said one end of said current sense resistor junction to said first current input;
      viii. a second resistor coupling said other end of said current sense resistor to said second current input;
      ix. a comparator having a first input coupled to said first current input and a second input coupled to said second current input and an output coupled to said switch control input; and
      x. said ON/OFF signal coupled to said first and second current sink control first and second control inputs.

20. A laptop computer system according to claim 19 and further including a voltage converter having a dc output coupled to said voltage input terminal.

21. A laptop computer system according to claim 19 switch and further including a first switch driver between said comparator and said first switch.

22. A laptop computer system according to claim 21 and further including an inductor having one end coupled to said switch output and another end coupled to said one end of said current sense resistor.

23. A laptop computer system according to claim 22 and further including a circuit coupling said one end of said inductor to ground.

24. A laptop computer system according to claim 23 wherein said circuit coupling said one end of said inductor to ground comprises a catch diode.

25. A laptop computer system according to claim 23 wherein said circuit coupling said one end of said inductor to ground comprises a second switch having an input coupled to said inductor, an output coupled to ground and a second switch control input coupled to the output of said comparator.

26. A laptop computer system according to claim 20 and further including a first hystersis circuit coupled between said output of said comparator and one of its first and second inputs.

27. A laptop computer system according to claim 20 and further including a second hystersis circuit coupled between the output of said comparator and said first current sink first control input.

28. A method of charging a battery in a computer comprising:
   a. switching a supply voltage to the battery on and off at a first predetermined frequency; and
   b. controlling the average current supplied to said battery by controlling a duty cycle of said switching.

29. The method of charging a battery according to claim 28 wherein said step of switching a supply voltage comprises:
   a. switching a supply voltage on to cause a current to flow to the battery;
   b. sensing the current flowing to the battery;
   c. switching said supply voltage off when a first predetermined value of current is sensed;
   d. switching said supply voltage on again when said current drops below a second predetermined value;
   e. continuing to repeat steps b–d to result in switching on and off at paid first predetermined frequency.

30. The method according to claim 29 wherein said step of sensing current flow comprises sensing the voltage drop across a current sense resistor having one end coupled to said supply voltage and the other end to the battery by steps comprising:
   a. sinking current through a first resistor coupled to an input side of said resistor to establish an offset voltage;
   b. comparing said offset voltage to the battery voltage at the other side of said resistor;
   c. switching said supply voltage off when the battery voltage at the other side of said current sense resistor drops below said offset voltage; and
   d. establishing a hystersis.

31. The method according to claim 30 wherein:
   a. said step of controlling is accomplished by sinking current from said other side of said current sense resistor through a second resistor and stopping sinking of current through said first resistor to disable said switching on and off at said first frequency; and
   b. said step of comparing comprises comparing the voltage developed across said first resistor with the voltage developed across said second resistor.

* * * * *

UNITED STATES PATENT AND TRADEMARK OFFICE
CERTIFICATE OF CORRECTION

PATENT NO. : 5,889,387

DATED : March 30, 1999

INVENTOR(S) : MASSIE, H.

It is certified that error appears in the above-identified patent and that said Letters Patent is hereby corrected as shown below:

| | |
|---|---|
| Column 2, line 32 | "and off is supplied." should be --and off.-- |
| Column 2, line 50 | "coupled the" should be --coupled to the-- |
| Column 7, line 24 | "having and an input" should be --having an input-- |
| Column 7, line 43 | "having in input" should be --having an input-- |
| Column 8, line 42 | "off at paid first" should be --off at said first-- |

Signed and Sealed this

Eighth Day of February, 2000

Attest:

Q. TODD DICKINSON

Attesting Officer

*Commissioner of Patents and Trademarks*